United States Patent [19]

Bartels

[11] 4,284,878
[45] Aug. 18, 1981

[54] FLUID LEVEL DETECTOR

[75] Inventor: Harold U. Bartels, Riverside, Calif.

[73] Assignee: Bourns Medical Systems, Inc., Riverside, Calif.

[21] Appl. No.: 68,116

[22] Filed: Aug. 20, 1979

[51] Int. Cl.³ .......................................... F24H 1/06
[52] U.S. Cl. ................................ 219/272; 219/441; 219/506; 340/622
[58] Field of Search .......................... 73/295, 362.8; 236/20 R, 21 R, 21 B, 3, 94; 340/622; 137/386; 219/441, 442, 506, 272

[56] References Cited

U.S. PATENT DOCUMENTS

| 2,287,583 | 6/1942 | Weeks | 219/323 |
|---|---|---|---|
| 2,468,676 | 4/1949 | Liben | 73/295 |
| 2,657,299 | 10/1953 | McNairy | 219/441 |
| 2,928,037 | 3/1960 | Lawrence | 73/295 |
| 3,226,528 | 12/1965 | Martin | 236/94 |
| 3,290,484 | 12/1966 | Day | 219/441 |
| 3,485,100 | 12/1969 | Petersen | 73/295 |
| 3,592,059 | 7/1971 | Chilton | 73/362.8 |
| 3,851,529 | 12/1974 | Andrews | 73/362.8 |

Primary Examiner—Gerald Goldberg
Assistant Examiner—Denis E. Corr

[57] ABSTRACT

Fluid level detection means utilizing a thermally conductive element in the general shape of a cone, in one embodiment, in direct contact with fluid whose level is to be detected. A portion of the element, excluding the apex, is directly heated. A thermal sensor is bonded to the apex. When the fluid depletes such that the apex is exposed to air, the temperature in the immediate vicinity of the apex rises to a new point of equilibrium. The sensor converts this elevated temperature into a signal recognized by electronic circuitry as a flow fluid level. This signal may subsequently be used to provide visual or audible alarm.

9 Claims, 3 Drawing Figures

FLUID LEVEL DETECTOR

BACKGROUND OF THE INVENTION

1. Field of the Invention

This invention relates generally to low fluid level detectors and more particularly to the detection of low fluid levels in humidifiers as used in medical respiratory apparatus.

2. Description of the Prior Art

Humidifiers used in inhalation therapy incorporate a fluid reservoir in which the fluid capacity is kept small in order to minimize changes in pneumatic system compliance resulting from depletion of the fluid. It thus becomes necessary to refill the reservoir periodically. Prior art visual fluid level markings on the reservoir did not command the necessary attention. At least some float switches, conductivity sensors, etc., employed to detect low fluid level in the prior art have suffered from lack of upkeep by the user, thus when most needed, were inoperative.

A novelty search conducted in the United States Patent and Trademark Office to locate patents relevant to the above topic did not disclose any patents contemplating the instant means of fluid level detection. The following, however, were considered to be of potential interest:

| Patent No. | Title | Inventor |
| --- | --- | --- |
| 3,461,907 | "Liquid Level Control Device for Refrigeration Systems" | C. P. Wood, Jr. |
| 2,619,566 | "Actuating Apparatus Responsive to Change in Fluid Level" | C. F. Mahoney |
| 3,703,693 | "Liquid Level Sensing System" | R. N. Levinn |
| 3,335,243 | "Bimetal Indicator Device with a Heater Energized Under all Operative Conditions" | J. R. Canaday |
| 3,029,354 | "Level Control and Indicating Mechanism" | J. E. Watkins |
| 2,570,451 | "Liquid Level Control System" | F. W. Hottenroth |
| 2,675,019 | "Liquid Level Control" | P. F. Shivers |

The fields of search were:
Class 137 Subclass 386

It would thus be a great advantage to the art to provide a low fluid level detection means.

Another advantage would be the provision of a low fluid level detection means having no moving parts, thus requiring no user maintenance.

A further desirable advantage would be the provision of such a detection means independent of periodic calibration.

SUMMARY OF THE INVENTION

In light of the advantages sought to be accomplished in the instant invention, it is thus an object of the present invention to provide a means to sense a low fluid level in a respirator humidifier system.

Another object is to provide a low fluid level detection means having no moving parts.

A still further object is to provide a low fluid level detection means that does not require periodic calibration.

In the accomplishment of these and other objects, a fluid level detection means is provided in which a heater element cover is maintained in direct contact with the fluid whose low level is to be detected. An electric heating element directly heats the heater element cover except for a small portion, indirectly heated by heat conduction, that houses a thermal sensor. The thermal sensor is bonded to this indirectly heated portion by means contemplated to provide good heat transfer to the thermal sensor. A thermistor employed as a thermal sensor, for example, will exhibit a level of electrical resistance as a function of temperature. Thus, if the indirectly heated portion of the heater element cover is completely submerged in the fluid, the temperature sensed by the thermistor will be near to that of the fluid. As the fluid is heated by the electric heating element through the heater element cover, the resistance of the thermistor will decrease with increasing temperature sensed by it in its environment. Upon the attainment of a predetermined elevated temperature of the fluid as evidenced by the decrease in the electrical resistance level of the thermistor, control electronics of the system operate to control the application of electric power to the electric heating element. Upon subsequent cooling of the fluid, the resistance of the thermistor increases with decreasing temperature sensed by it in its environment and again, upon the attainment of a predetermined depressed temperature of the fluid as evidenced by the increase in the electrical resistance level of the thermistor, control electronics of the system operate to control the application of electric power to the heating element. As long as the indirectly heated portion of the heater element cover is submerged in a fluid or good thermal conductivity relative to air, this portion of the heater element cover will remain at a temperature substantially near to that of the fluid. In the event that the fluid becomes depleted, however, and this indirectly heated portion of the heater element cover becomes exposed to air, the temperature of this portion will rise to a much higher value than if it were submerged in the fluid. At this higher temperature, the electrical resistance of the thermistor will decrease drastically in comparison with its decrease when the indirectly heated portion of the heater element cover was exposed only to the fluid. This comparatively drastic decrease in the electrical resistance of the thermistor is then interpreted by the control electronics as a low fluid level and appropriate warning devices may be activated. Any configuration which permits the exposure to the air of the indirectly heated portion of the heater element cover upon the lowering of the fluid level to a predetermined mark will serve for the purposes of the invention. A cone, for example, has been employed with the thermal sensor bonded to the interior of the apex. A pyramidal configuration might be employed or any other configuration permitting the exposure as explained above. It is not the intention for this invention to be bound by any configuration adopted for the heater element cover and it is expressly affirmed that many configurations may be adopted without departing from the spirit, scope and contemplation of the invention.

BRIEF DESCRIPTION OF THE DRAWINGS

Further advantages and features of the present invention will be more fully apparent to those skilled in the art to which the invention pertains from the ensuing detailed description thereof, regarded in conjunction with the accompanying drawings wherein like reference characters refer to like parts throughout and in which.

DETAILED DESCRIPTION

Although a specific preferred embodiment of the invention will now be described with reference to the drawings, it should be understood that such embodiment is by way of example only and merely illustrative of but one of many possible specific embodiments which can represent applications of the principles of the invention. Various changes and modifications obvious to one skilled in the art to which the invention pertains are deemed to be within the spirit, scope and contemplation of the invention as further defined in the appended claims.

Figure 1:
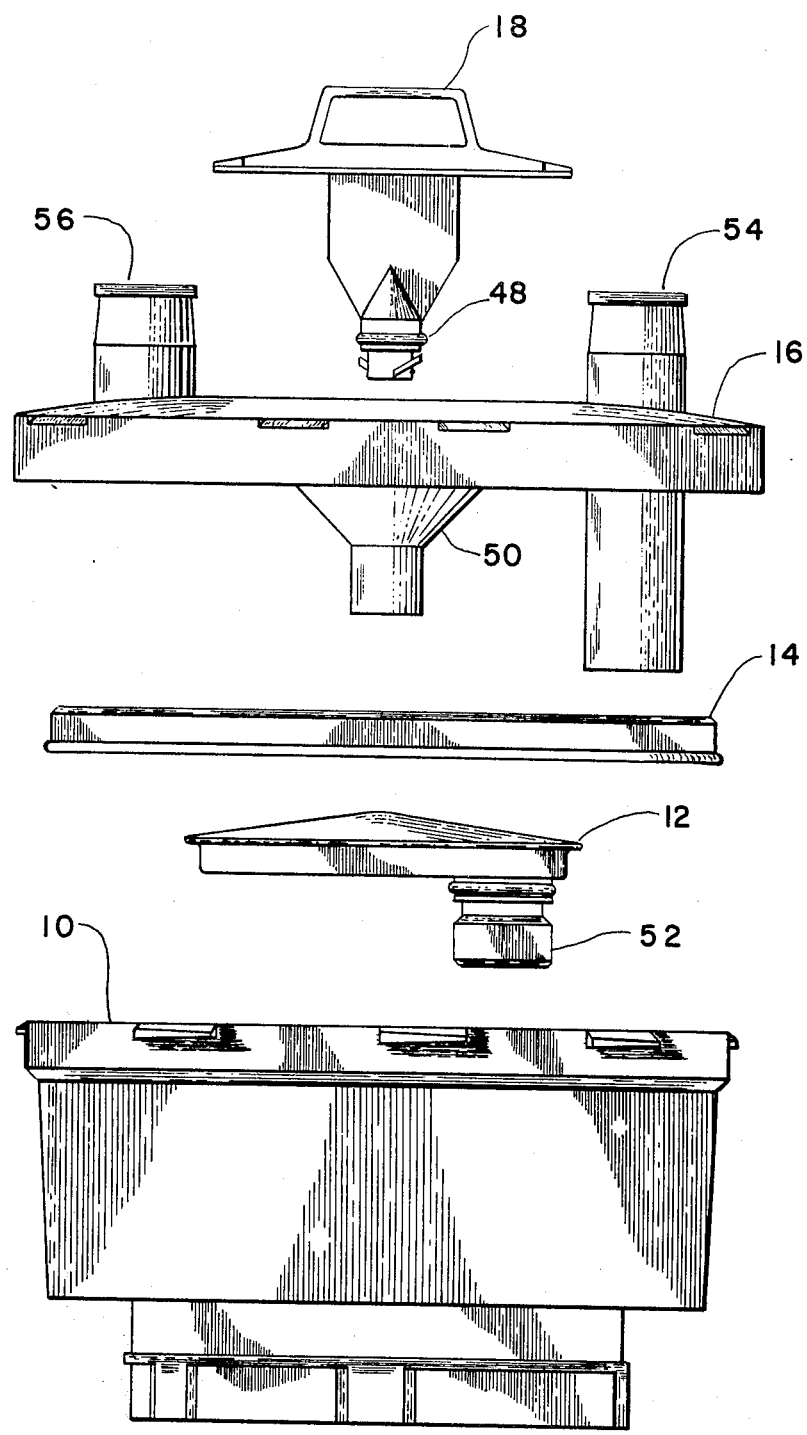
FIG. 1 is an idealized, conceptualized drawing showing the principal elements of a humidifier system.

Referring to FIG. 1 with greater particularity, a system in which the present invention might be utilized is illustrated. The basic jar assembly 10 accepts a heater assembly 12 having a connector assembly 52. This heater assembly 12 will receive the major attention in this specification since it contains the sensing elements making up the level detector. A lip seal 14 effects the sealing of a chamber cover 16 to the basic jar assembly 10. The chamber cover 16 is entirely conventional except for its funnel 50, having a breathing gas inlet 54 and an outlet 56. The system may be sealed by the application of filler cap 18 having an O-ring 48.

Figure 2:
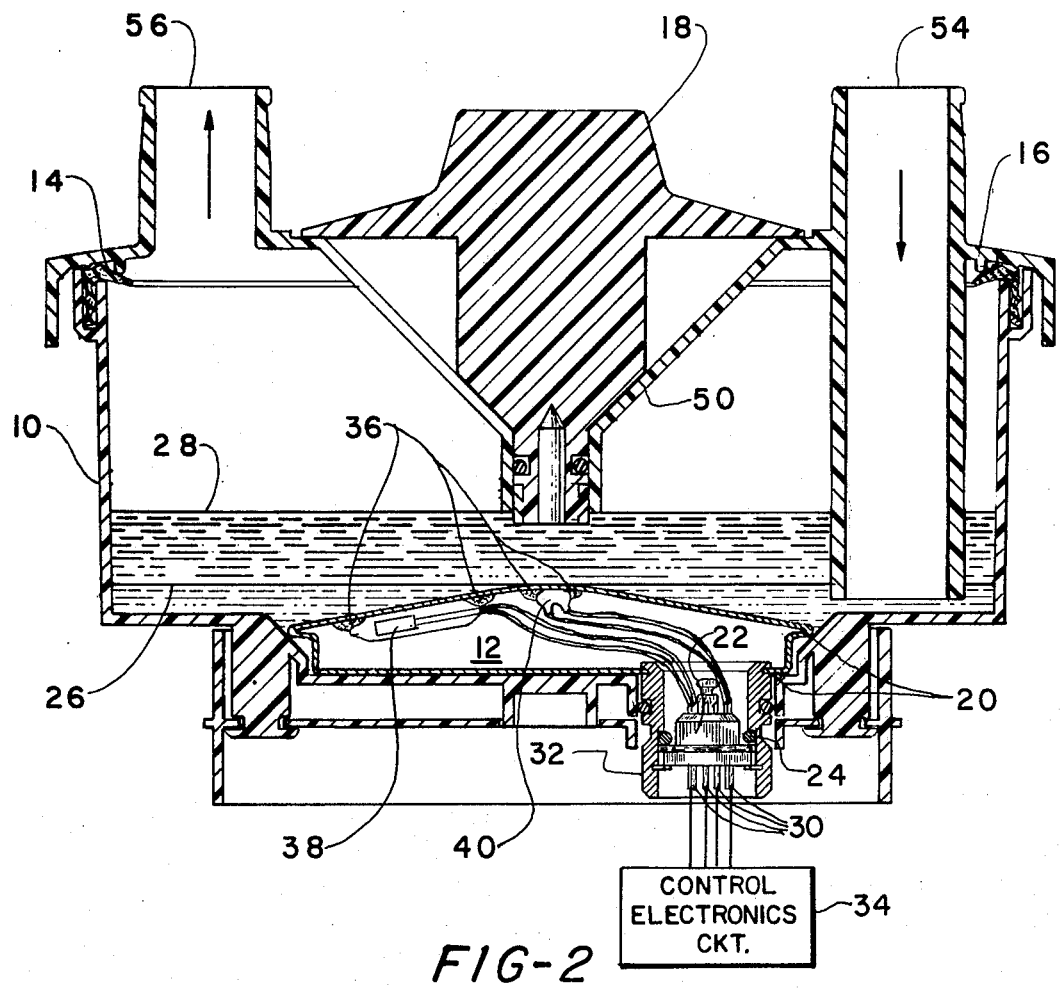
FIG. 2 is a cross-section of the assembled humidifier system including details of the heater and level detector.
Figure 3:
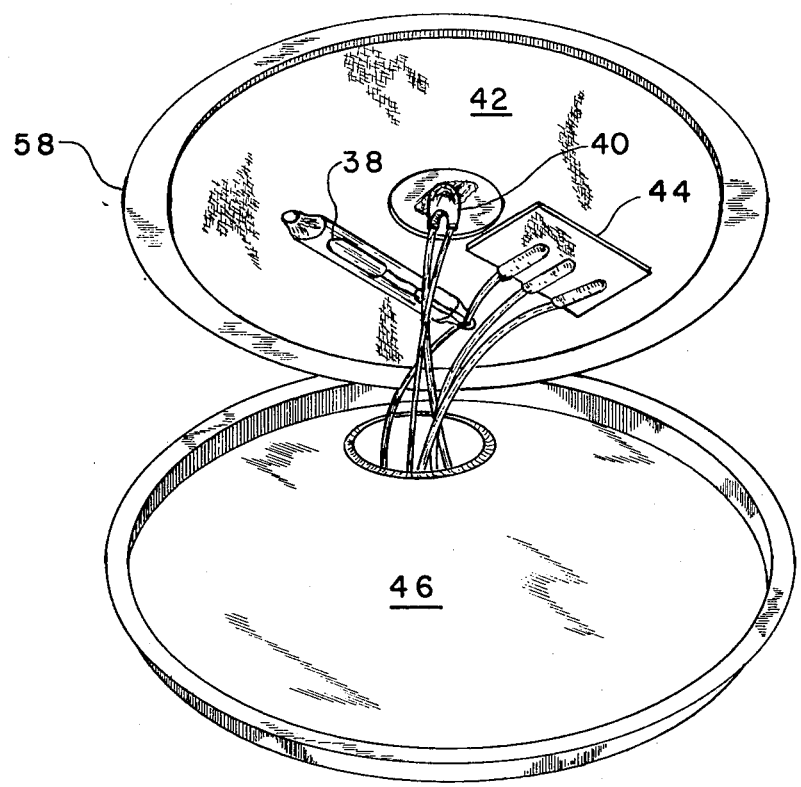
FIG. 3 is a perspective drawing showing the interior of the heater and level detector.

FIGS. 2 and 3 show details of the heater assembly 12 with the heater assembly itself incorporated into the humidifier system. High and low water levels, 28 and 26 respectively, are determined by the lower dimension of the funnel 50 and the top extremity of heater assembly 12 respectively. The heater assembly 12 is sealed against the environment by hermetic seal 20 and ethylene propylene rubber O-ring 24. Electrical power is supplied to electrical connector pins 30 secured in header 22, itself retained in shroud 32. Electrical power thus supplied furnishes operating voltages for redundant thermostat 38 and thermistor sensor 40. These elements, thermostat 38 and thermistor 40, are secured to cover 58 (FIG. 3) by means of silicone bonding compound 36. In addition, electrical power from a control electronics circuit 34 is supplied to blanket heater element 42, by way of the electrical connector pins 30, to heat the heater element cover 58 in a manner to be discussed. The source of the power to the control electronics circuit 34 is not of immediate concern for the purposes of the present invention. Terminal block 44 provides for necessary internal electrical connections. Base 46 seals to cover 58 so as to provide protection of the internal elements from the external environment.

Operation of the low fluid level detector may be understood from a consideration of basic principles in conjunction with the drawings. It is well known that heat conduction from or to a body is proportional to the temperature gradient existing between the body and the surrounding medium. For purposes of the discussion herein, the approximation that heat conduction from a body is proportional to the temperature rise of the body over the surrounding medium and to the thermal conductivity of the medium, is sufficient. Thermal conductivity of water is about 27 times greater than for air. Therefore, within the limits of our approximation, at constant heat dissipation, the temperature rise of a body immersed in air would be approximately 27 times the temperature rise of that body immersed in water. In the device contemplated by the invention herein, the heater assembly 12 forms the bottom surface of the fluid reservoir, where we assume for purposes of discussion that the fluid is water. The somewhat conical shape of the heater assembly has a thermistor sensor 40 bonded by silicone bonding compound 36 to the raised center section as shown. This thermistor is surrounded by the blanket heater assembly element 42. As long as this heater is underwater, the thermistor 40 perceives substantially the temperature of the water. As the water depletes, the indirectly heated raised center section becomes exposed to air and the rise in temperature of the center section becomes approximately 27 times greater. The thermistor action then furnishes an electronic signal interpreted as a "low-water" signal that may then be processed according to user convenience.

The operation of the low fluid level detector will now be more specifically explained. In the operation of the low fluid level detector, the heater element cover 58 is maintained in direct contact with a fluid such as, for example, water whose low level is to be detected. The blanket heater element 42 directly heats the heater element cover 58, except for the small raised center portion or top extremity of assembly 12, which portion is indirectly heated by heat conduction. This raised center portion houses the thermistor 40. The thermistor 40 is attached to this indirectly heated raised center portion by means of the silicone silicon bonding compound 36 to provide good heat transfer to the thermistor 40. The thermistor 40 will exhibit a level of electrical resistance as a function of temperature. Thus, if the indirectly heated portion of the heater element cover 58 is completely submerged in the water, the temperature sensed by the thermistor 40 will be near to that of the water.

As the water is heated by the blanket heater element 42 through the heater element cover 58, the resistance of the thermistor 40 will decrease with increasing temperature sensed by it in its environment. Upon the attainment of a predetermined elevated temperature of the water as evidenced by the decrease in the electrical resistance level of the thermistor 40, the control electronics circuit 34 operates to control the application of electric power to the blanket heater element 42.

Upon subsequent cooling of the water, the resistance of the thermistor 40 increases with decreasing temperature sensed by it in its environment and again, upon the attainment of a predetermined depressed temperature of the water as evidenced by the increase in the electrical resistance level of the thermistor 40, the control electronics circuit 34 operates to control the application of electric power to the heater element 42.

As long as the indirectly heated portion of the heater element cover 58 is submerged in the water, which has good thermal conductivity relative to air, this portion of the heater element cover 58 will remain at a temperature substantially near to that of the water. In the event that the water becomes depleted, however, and this indirectly heated portion of the heater element cover 58 becomes exposed to air, the temperature of this portion will rise to a much higher value than if it were submerged in the water. At this higher temperature, the electrical resistance of the thermistor 40 will decrease drastically in comparison with its decrease when the indirectly heated portion of the heater element cover 58 was exposed only to the water. As discussed before, the temperature rise of the indirectly heated portion immersed in air is approximately 27 times the temperature rise of that portion immersed in water. The comparatively drastic decrease in the electrical resistance of the thermistor 40 is then interpreted by the control electronics circuit 34 as a "low fluid" level and an appropriate warning device (not shown) may be activated.

Thus, the thermistor 40 supplies a signal to the control electronics circuit 34, which signal varies as a function of the temperature sensed in the raised center portion of the cover 58. The control electronics circuit 34 uses this signal from the thermistor 40 to control the application of electrical power to the blanket heater element 42 as a function of the temperature sensed by the thermistor 40, and to further provide an alarm for a "low water" level when the raised center portion becomes exposed to air.

Thus there has been described a low fluid level detector that will reliably sense a low fluid level with a minimum of electronic and mechanical complexities. The device described is independent of user servicing and independent of periodic calibrations. Great improvements in reliability, flexibility, maintainability, ease of operation and safety have been provided through the novel advantages of the invention.

It is pointed out that, although the present invention has been shown and described with reference to a particular embodiment, various changes and modifications obvious to one skilled in the art to which the invention pertains are deemed to lie within the purview of the invention.

What is claimed and desired to be secured by Letters Patent of the United States is:

1. A device for detecting when the level of fluid in a vessel decreases below a predetermined fluid level, said device comprising:

a thermally conductive cover element covering at least part of the bottom of the vessel and having a raised portion rising to the predetermined fluid level;

heating means for directly heating conductively substantially all of said cover element except for said raised portion;

heat sensitive means, attached to the interior of said cover element in said raised portion for producing an output signal which varies in amplitude as a function of the temperature sensed in said raised portion, said output signal varying around a first level when said raised portion is submerged below the surface of said fluid and varying around a second level when said raised portion is exposed to air; and a control circuit for (a) regulating the temperature of said fluid below the boiling point thereof by controlling the application of electric power to said heating means as a function of the amplitude of said output signal when said output signal varies around said first level, and (b) producing a warning signal when the output signal is varying around the second level.

2. The device of claim 1, wherein said heat-sensitive means includes a thermistor.

3. The device of claim 1, wherein said cover element is substantially pyramidal in shape.

4. The device of claim 1, wherein said cover element is generally conical in shape.

5. The device of claim 1, wherein said heating means comprises an electrically powered heating element attached to, and covering substantially all of, the interior surface of said cover element except for said raised portion.

6. The device of claim 5, wherein said cover element is generally in the configuration of a cone and said heating element is generally annular in configuration.

7. A device for detecting a predetermined level of fluid in a vessel, comprising:

a thermally conductive cover element attached to the bottom of said vessel, and having an interior surface with first and second areas, said cover element having a shape which permits exposure to air of substantially only said second area when said fluid in said vessel is at said predetermined level;

heat-sensitive means attached to and in thermal communication with said second area, for producing an electrical output signal having an amplitude which varies around a first level in response to the temperature of said second area when said second area is below the surface of said fluid, and around a second level in response to the temperature of said second area when said second area is exposed to air;

means attached to said first area of said cover element for heating said first area of said cover element; and a control circuit for (a) regulating the temperature of said fluid below the boiling point thereof by controlling the application of electric power to said heating means as a function of the amplitude of said electrical output signal when said output signal is varying around said first level, and (b) producing a warning signal when said electrical output signal is varying around said second level.

8. The device of claim 7, wherein said cover element has a shape substantially in the form of a cone, with said second area being in the proximity of the apex of said cone.

9. The device of claim 7, wherein said heat-sensitive means includes a thermistor attached to said second area.

* * * * *